US008010555B2

(12) United States Patent
Eichhorn

(10) Patent No.: US 8,010,555 B2
(45) Date of Patent: Aug. 30, 2011

(54) SYSTEM AND METHOD FOR MANAGING IMAGES OVER A NETWORK

(75) Inventor: Ole Eichhorn, Westlake Village, CA (US)

(73) Assignee: Aperio Technologies, Inc., Vista, CA (US)

( * ) Notice: Subject to any disclaimer, the term of this patent is extended or adjusted under 35 U.S.C. 154(b) by 0 days.

(21) Appl. No.: 11/770,499

(22) Filed: Jun. 28, 2007

(65) Prior Publication Data

US 2008/0065645 A1    Mar. 13, 2008

Related U.S. Application Data

(60) Provisional application No. 60/806,441, filed on Jun. 30, 2006.

(51) Int. Cl.
*G06F 7/00* (2006.01)
*G06F 17/30* (2006.01)

(52) U.S. Cl. .......................... 707/770; 707/915; 707/966

(58) Field of Classification Search .................. 707/1–3, 707/10, 100–102, 104.1, 204, 661, 818, 619, 707/609, 770, 915, 966
See application file for complete search history.

(56) References Cited

U.S. PATENT DOCUMENTS

| | | | |
|---|---|---|---|
| 3,643,015 A | 2/1972 | Davidovits et al. |
| 4,673,988 A | 6/1987 | Jansson et al. |
| 4,700,298 A | 10/1987 | Palcic et al. |
| 4,742,558 A | 5/1988 | Ishibashi et al. |
| 4,744,642 A | 5/1988 | Yoshinaga et al. |
| 4,760,385 A | 7/1988 | Jansson et al. |
| 4,777,525 A | 10/1988 | Preston, Jr. |
| 4,845,552 A | 7/1989 | Jaggi et al. |
| 4,960,999 A | 10/1990 | McKean et al. |
| 5,086,477 A | 2/1992 | Yu et al. |
| 5,187,754 A | 2/1993 | Currin et al. |
| 5,231,663 A | 7/1993 | Earl et al. |
| 5,400,145 A | 3/1995 | Suita et al. |
| 5,412,214 A | 5/1995 | Suzuki et al. |
| 5,495,535 A | 2/1996 | Smilansky et al. |
| 5,578,832 A | 11/1996 | Trulson et al. |

(Continued)

OTHER PUBLICATIONS

Written Opinion issued in PCT/US07/072527 on Jun. 17, 2008.

(Continued)

*Primary Examiner* — John R. Cottingham
*Assistant Examiner* — Susan F Rayyan
(74) *Attorney, Agent, or Firm* — Pattric J. Rawlins; Procopio Cory Hargreaves & Savitch LLP

(57) ABSTRACT

Images created by one or more image acquisition devices are initially stored in remote data bases at one or more remote or satellite locations and copies of the images are subsequently transferred to a central server at a central storage location over a network and stored in a central data base. A common catalog listing local image files stored at the central data base and remote image files stored at one or more remote data bases is stored at the central location and is accessed by users to search for images. User requests for images associated with local image files result in transfer of the requested images by the central server to the user. User requests for images associated with remote image files are relayed by the central server to the associated remote location, and the requested images are then relayed to the user from the remote location via the central server.

15 Claims, 3 Drawing Sheets

U.S. PATENT DOCUMENTS

| | | | |
|---|---|---|---|
| 5,633,948 A | 5/1997 | Kegelmeyer, Jr. | |
| 5,644,356 A | 7/1997 | Swinson et al. | |
| 5,672,861 A | 9/1997 | Fairley et al. | |
| 5,710,835 A | 1/1998 | Bradely | |
| 5,714,756 A | 2/1998 | Park et al. | |
| 5,790,710 A | 8/1998 | Price et al. | |
| 5,793,969 A | 8/1998 | Kamentsky et al. | |
| 5,796,861 A | 8/1998 | Vogt | |
| 5,834,758 A | 11/1998 | Trulson et al. | |
| 5,872,591 A | 2/1999 | Truc et al. | |
| 5,912,699 A | 6/1999 | Hayenga et al. | |
| 5,922,282 A | 7/1999 | Ledley | |
| 5,943,122 A | 8/1999 | Holmes | |
| 5,963,314 A | 10/1999 | Worster et al. | |
| 5,968,731 A | 10/1999 | Layne et al. | |
| 5,991,444 A | 11/1999 | Burt et al. | |
| 5,999,662 A | 12/1999 | Burt et al. | |
| 6,002,789 A | 12/1999 | Olsztyn et al. | |
| 6,005,964 A | 12/1999 | Reid et al. | |
| 6,049,421 A | 4/2000 | Raz et al. | |
| 6,078,681 A | 6/2000 | Silver | |
| 6,091,846 A | 7/2000 | Lin et al. | |
| 6,101,265 A | 8/2000 | Bacus et al. | |
| 6,272,235 B1 | 8/2001 | Bacus et al. | |
| 6,327,377 B1 | 12/2001 | Rutenberg et al. | |
| 6,330,348 B1 | 12/2001 | Kerschmann et al. | |
| 6,438,268 B1 | 8/2002 | Cockshott et al. | |
| 6,519,357 B2 | 2/2003 | Takeuchi | |
| 6,711,283 B1 | 3/2004 | Soenksen | |
| 6,714,281 B1 | 3/2004 | Amano et al. | |
| 7,467,160 B2 * | 12/2008 | McIntyre | 1/1 |
| 2002/0102028 A1 * | 8/2002 | Keller et al. | 382/239 |
| 2003/0005464 A1 * | 1/2003 | Gropper et al. | 725/115 |
| 2004/0070678 A1 * | 4/2004 | Toyama et al. | 348/231.3 |
| 2004/0111415 A1 * | 6/2004 | Scardino et al. | 707/10 |
| 2005/0007625 A1 * | 1/2005 | Garcia | 358/1.15 |
| 2005/0273514 A1 * | 12/2005 | Milkey et al. | 709/232 |
| 2006/0083442 A1 * | 4/2006 | Loukipoudis et al. | 382/305 |
| 2006/0095540 A1 * | 5/2006 | Anderson et al. | 709/217 |
| 2006/0111083 A1 * | 5/2006 | Goss | 455/412.1 |
| 2006/0226232 A1 * | 10/2006 | Helkio et al. | 235/472.01 |
| 2007/0118536 A1 * | 5/2007 | McIntyre et al. | 707/10 |

OTHER PUBLICATIONS

European Search Report dated Aug. 19, 2009 from related European Application No. 07840329.2.

* cited by examiner

SYSTEM AND METHOD FOR MANAGING IMAGES OVER A NETWORK

RELATED APPLICATION

The present application claims the benefit of co-pending U.S. provisional patent application No. 60/806,441 filed Jun. 30, 2006, which is incorporated herein by reference in its entirety.

BACKGROUND

1. Field of the Invention

The present invention relates to a system and method for managing images over networks such as wide-area networks.

2. Related Art

Accessing images over wide-area networks presents several challenges. Images may be acquired at multiple locations for viewing at many other locations. Users wishing to view images may not know which images are available and where each image is located. The locations at which images are acquired may not have inbound connectivity and/or may not have sufficient bandwidth to support many concurrent users. Additionally, these locations may have limited computing resources such as processing power and storage. Images may be large, making transfer of images from one location to another inefficient.

Therefore, what is needed is a system and method that reduces or overcomes these significant problems found in the conventional systems as described above.

SUMMARY

Embodiments described herein provide for a system and method for managing images over a wide-area network at a central server in communication with remote servers associated with image acquisition devices and with user viewing devices over the network.

According to one embodiment, a method of managing images over a wide-area network is provided, which comprises storing image files at a remote storage location associated with at least one image acquisition device, transferring copies of image files stored at the remote location through a network to a central storage location at selected times, creating a central or common catalog of local image files which are available at the central storage location and remote image files which are available at the remote storage location, and storing the central catalog at the central storage location for access and searching by users.

In one embodiment, the method includes sending an identifier for each newly acquired image file at the remote storage location to a central server, storing the image file identifier and associated remote storage location in the central catalog, and updating the image file identifier in the central catalog to indicate storage at the central storage location when image file transfer is complete.

In one embodiment, after the central catalog has been updated to show that a copy of the image file now resides at the central storage location, the image file is deleted from the remote storage location. This reduces storage and bandwidth requirements at the remote storage location.

Users search the central catalog via the network for image files which they wish to view, and send image requests to the central server. If the requested image file is located at the central storage location, the requested image data is returned to the user by the central server. If a copy of the requested image file is not yet transferred from the remote storage location to the central storage location, the image request is relayed from the central server to the remote server, and the requested image data from the remote server is relayed by the central server to the user.

The central server may receive and store image files acquired at multiple remote locations from a plurality of remote data bases, and multiple viewers may connect to a common database at the central server location to access the catalog in order to determine what images are available. Image access requests from viewers or users are directed to the location where the requested image resides, which may be the central storage or data base or a remote storage facility or data base.

According to another embodiment, an image management system is provided, which comprises a central data base module which stores image files and a searchable catalog of available image files, a central server which receives identifiers of image files stored in at least one remote data base from a remote server associated with the remote data base, the central server having a file transfer handling module which controls transfer of copies of data files from the remote data base to the central data base module, and a catalog update module which adds identifiers of image files stored in the remote data base to the searchable catalog and which updates each image file identifier to show that the image file is located in the central data base module when the transfer of a copy of the respective image file to the central data base is complete.

This method and system supports a configuration of multiple, remote image acquisition locations and multiple viewing locations which are managed by an image management system at a central location which is connected to the acquisition locations and viewing locations over a network such as a wide-area network. Viewers can connect to a central location to view a catalog of images currently available both at the central location and at the image acquisition locations. Requested images are provided to viewers either from the central location when the image files currently reside in a central data base at that location, or from remote locations via the central location when copies of the image files are not yet transferred to the central location.

In one embodiment, viewers can search a single central or common catalog which has a list of image files created at multiple acquisition locations, and can request a file from the central location regardless of whether the image file has already been copied to data storage at the central location. This means that image files do not have to be transferred immediately from the acquisition location to the central location, but can be transferred in a manner designed to reduce bandwidth contention, for example by incorporating "pacing" to reduce the rate at which images are copied, or by scheduling the transfer to run at particular times of day or particular days when reduced bandwidth requirements are anticipated, or by a combination of both techniques.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a method and system of managing images over a network such as a wide-area network. For example, one method and system as disclosed herein allows for users to identify and request images from a central catalog of image files comprising files stored at a central location as well as files stored at remote locations.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

In the following description, a viewing device may be any type of device capable of receiving image files from a network and displaying the images to a viewer, such as a set top box (STB), personal computer, game console, cellular phone, personal digital assistant (PDA), personal media player, video equipment such as a digital video receiver (DVR), digital video disc (DVD) player (DVD), compact disc (CD) player, smart card, or the like. An acquisition device may be any type of device capable of creating digital images such as a microscope scanner or other type of scanner, a camera, a computer system, or the like.

Figure 1:
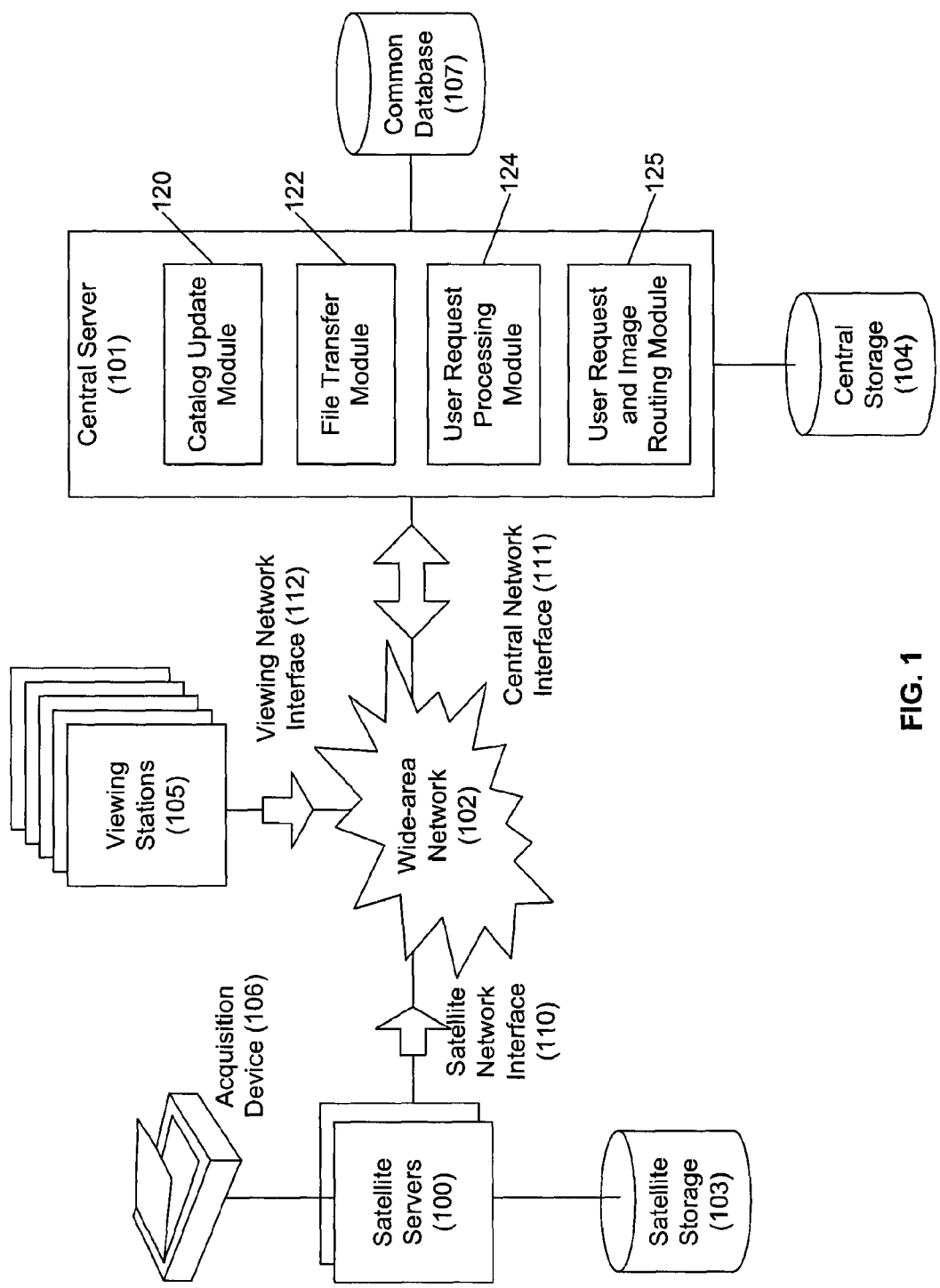
FIG. 1 is a schematic block diagram illustrating a first embodiment of an image management system.

FIG. 1 is a block diagram of an image management system according to one embodiment. The system includes a central server 101 communicatively coupled with a plurality of remote or satellite servers 100 and a plurality of viewing stations 105 over a network 102. Central server 101 has an interface 111 for communication over network 102. The central server is associated with a common data base 107 which stores a common catalog of available image files and a central storage data base 104 which stores image files. The common data base 107 and central storage data base 104 may be separate modules or may be included in a single data storage module. Remote or satellite servers 100 at locations remote from the central server are linked to network 102 via network interfaces 110. Each remote server 100 is associated with a remote or satellite data base 103. One or more data acquisition devices 106 capable of acquiring digital images are attached directly or via a local area network to each remote server 100. The user viewing stations 105 are linked to network 102 via viewing network interfaces 112.

Network 102 may comprise any of a variety of network topologies and physical layers. For example, network 102 may be a local area network ("LAN"), wide area network ("WAN"), a wireless wide area network ("WWAN") or a combination of networks such as the Internet. Moreover, the network 102 may employ different communication protocols such as TCP/IP, and the like, and application protocols such as HTTP, and the like.

As illustrated in FIG. 1, the central server has a catalog update module 120 which is configured to create and update a searchable catalog of image files available for viewing, a file transfer module 122 which is configured to control transfer of copies of image files from remote data bases 103 to the central storage or data base 104, a user request processing module 124 which is configured to handle user requests for image files, and a routing module 135 which is configured to route user requests and requested image files. Operation of these modules in one embodiment is described in more detail below in connection with FIGS. 2 and 3.

In one embodiment, the common catalog stored at the common data base 107 comprises a listing of local image files stored in central storage or data base 104 as well as remote image files currently stored at one or more remote storage locations, with the listing identifying the current location of each image file. Each satellite or remote server is configured to notify the central server each time a newly acquired image file is stored in the associated remote storage or data base 103, and the new remote image file and its current remote location is then added to the common catalog by the catalog update module, as explained in more detail below.

Figure 2:
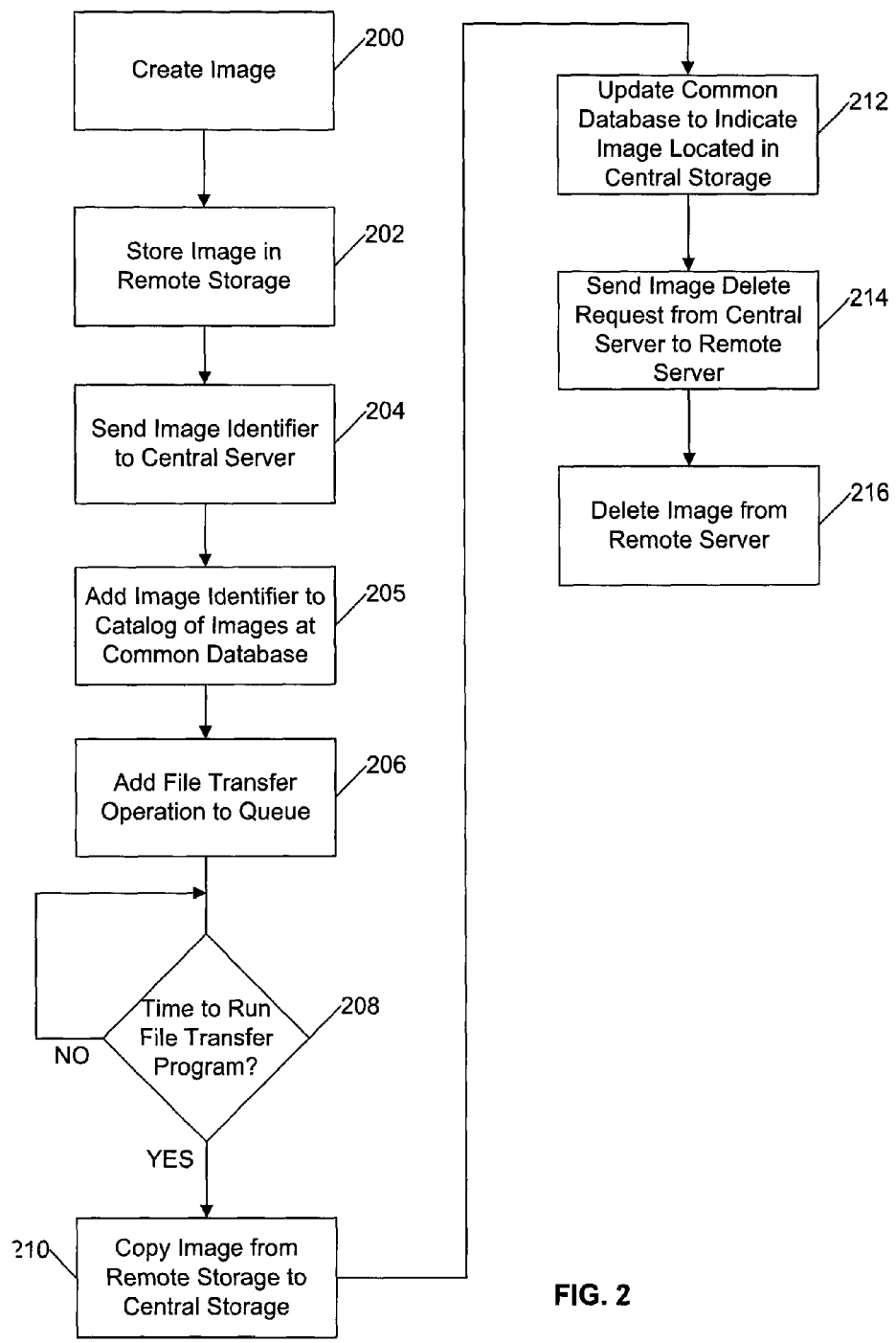
FIG. 2 is a schematic flow diagram illustrating one embodiment of a method of acquiring images in the system of FIG. 1.

FIG. 2 is a flow diagram illustrating one embodiment of a process for acquiring image files using the system of FIG. 1. At step 200, an image is created by the acquisition device 106 which is attached directly or via a local-area network to the remote or satellite server 100 at the acquisition location. The image is then provided to the remote server 100 and stored on the remote or satellite storage 103 attached to the remote server 100 (step 202). In step 204, an identifier for the image or image file is communicated to the central server via an outbound connection through the remote or satellite network interface 110 to the wide area network 102, and through the central network interface 111 to the central server. At step 205, the catalog update module 120 updates the catalog of images stored in common data base 107 to include the image file identifier and the current location of the image file at the satellite or remote storage data base 103.

At step 206, a file transfer operation is added by the file transfer module 122 to a queue stored in the common database 107. The file transfer module 122 at central server 101 incorporates a file transfer program. If it is time to run the file transfer program (step 208), as determined by schedule instructions incorporated in the file transfer module, the image is copied from the remote storage data base 103 and transferred to the central data base 104 (step 210). In this step, the file transfer program asynchronously accesses the image stored on the remote server 100 via an outbound connection made from the remote server 100 to the central server 101, and copies the image to the central storage 104 attached to the central server 101.

The file transfer module or program may incorporate "pacing" to reduce the rate at which images are copied, so as to reduce contention for bandwidth at the remote network interface 110 and central network interface 111. Alternatively, or additionally, the file transfer program may be scheduled to run at particular times of the day or days of the week, so as to reduce contention for bandwidth at the remote network interface 110 and central network interface 111.

After the file transfer program has copied the image from the satellite or remote storage 103 attached to the remote or satellite server 100 to the central storage 104 attached to the central server 101, the catalog in the common database 107 is updated to show that the image now resides at the central location (step 212).

After the catalog has been updated to show that the image resides at the central location, the image is deleted from the satellite or remote storage 103 attached to the remote server 100. The image is deleted by sending a request message from the central server 101 to the satellite server 100 (step 214), using the outbound connection previously made from the remote server 100 through the remote network interface 110 to the wide area network 102 and into the central network interface 111. At step 216, the satellite or remote server deletes the image from the remote storage or data base 103.

Figure 3:
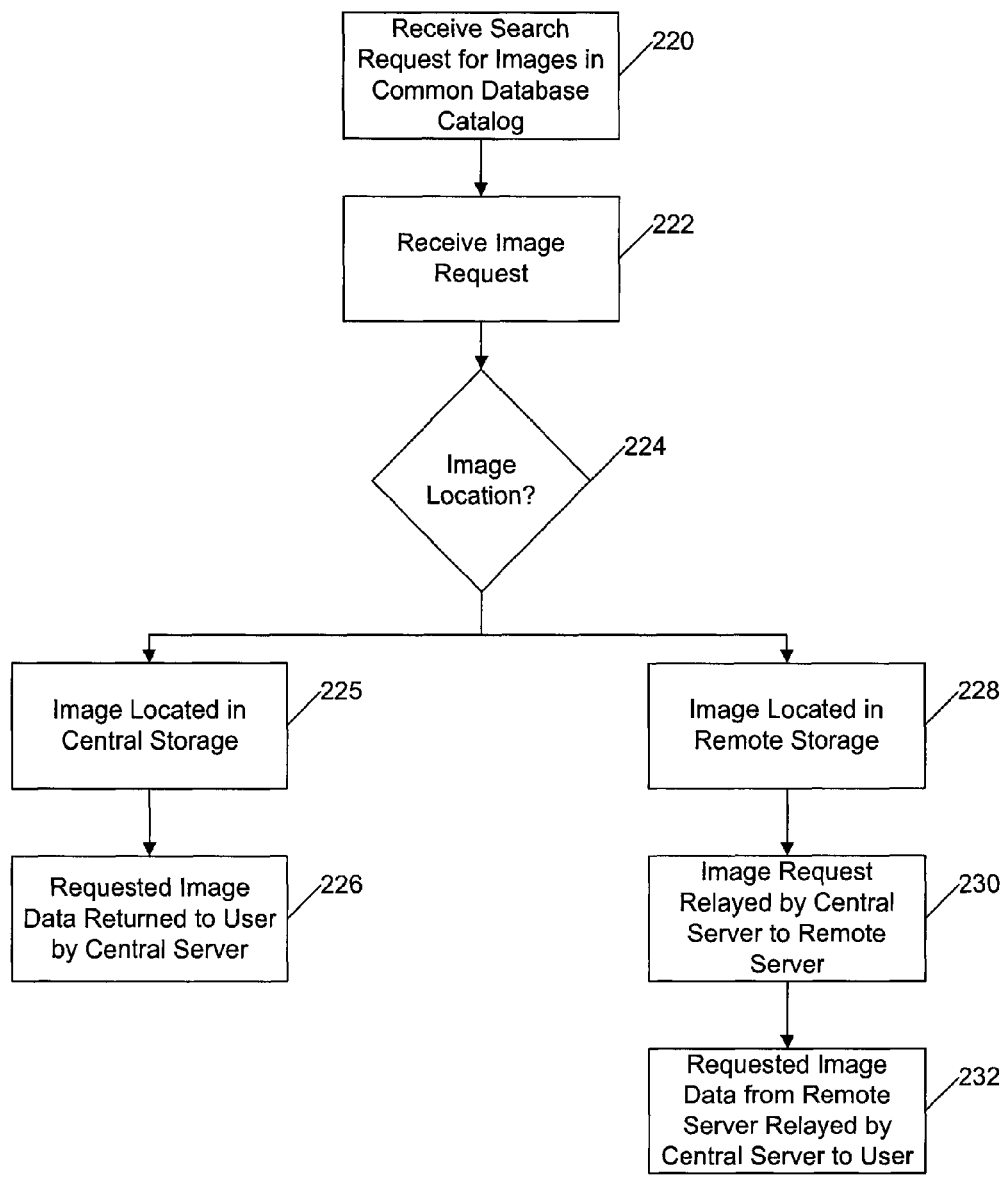
FIG. 3 is a schematic flow diagram illustrating one embodiment of a method of accessing and viewing images using the system of FIG. 1.

FIG. 3 is a flow diagram illustrating one embodiment of a method for accessing images using the system of FIG. 1. In step 220, a user from a viewing station 105 searches for images in the image catalog stored at common database 107 by making an outbound connection to the central server 101 through the viewing network interface 112 to the wide area network (102) and into the central network interface 111. The user then selects and requests an image found in the catalog of stored images (step 222). The user request processing module 124 at the central server 101 responds to the user's search requests by determining the location(s) at which the images are stored (step 224). If the entire image is stored at the central storage or data base 104 (step 225), the user request processing module 124 processes the request made from the viewing station 105 and returns the requested image data (which typically is only a small fraction of the data stored in an image file) to the viewing device (step 226). In one embodiment, the viewing device accesses the image data via an outbound connection to the central server 101 through the viewing network interface 112 to the wide-area network 102.

If a requested image is still stored at a satellite or remote location (step 228), i.e. after acquisition but before transfer to the central location is complete, the routing module 125 at the central server relays the image request to the appropriate remote server 100 (step 230), and the requested image data is relayed by the routing module 125 from the remote server to the viewing device via the central server 101 (step 232). Thus, the viewing station 105 accesses the image data via a connection to the remote server 100 through the central server 101.

In one embodiment, the remote server 100 maintains a connection to the central server 101 via an outbound connection through the remote network interface 110 to the wide-area network 102. The viewing station 105 makes a connection to the central server 101 via an outbound connection through the viewing network interface 112 to the wide-area network 102. In steps 230 and 232, the remote server processes requests made from a viewing station 205 and relayed to the remote server by the central server, and returns requested image data to the viewing device using the central server 101 as a message router. In one embodiment, the central server routing module 125 routes access requests and image data responses between the inbound connection from the viewing station 105 and the inbound connection from the remote server 100.

In one example, where the image data is scanned slide data from a microscope scanner, only a small fraction of the image or low resolution data is viewed by the user, and the user then zooms into the image at selected locations to view these locations at a larger resolution. Therefore, only a small fraction of the stored image data is typically may be relayed to the user or viewer in step 232. When an image file associated with requested image data is still stored at the remote server, the central server acts only as a connectivity relay in relaying the requested image data to the user when the image file is still stored at the remote server. Accessing of images on remote or satellite servers as illustrated in FIG. 3 takes place independently of the step of transferring image files from remote servers to the central server, and image data may be accessed on the remote server while a transfer of the same data is taking place in the background. The image data is accessed on the remote server until any pending transfer to the central server is complete, and the access on the remote server is the same regardless of whether the file transfer operation has begun or not. Once the transfer is complete, the catalog in data base 107 is updated and any subsequent request for the same image data is handled as indicated in step 226, by accessing the copy of the image data in central storage. In the above embodiment, images or image data files are initially stored at the same location where they are acquired. Images are immediately available for access/viewing after they are acquired.

A common database is used to store image information in the above embodiment. The image information is stored as a searchable catalog or list of available image data or files. Users can access the common database to find images and determine where they are located. Images are transferred from satellite locations to a central location "in the background", so as to minimize contention for bandwidth. Various techniques for minimizing contention are supported including pacing and tuning for time of day and day of week.

Because images are transferred from satellite locations to a central location, and subsequently deleted from the satellite locations, relatively few images reside at a satellite location at any time. This reduces storage and bandwidth requirements at a satellite location.

The central location can have overlapped and redundant resources for network connectivity, processing, and storage, enabling high-availability to the common database and to all images which have been transferred from satellite locations.

In one embodiment, only outbound connections are required from a satellite location to the central location, and only outbound connections may be required from a viewing station to the central location. Images are stored long-term at the central storage or data base at a central location or facility which may have provision for backups, disaster recovery, and the like. The central location may have more bandwidth and computing resources such as processor power and storage than satellite locations.

The viewing stations in the system described above may be located remotely from satellite locations and the central location. Users always connect to the central location to find and access images, and do not have to connect to various remote or satellite servers in order to find the images.

An example computer system may be used in connection with various embodiments described herein. For example, the computer system may be used in conjunction with the acquisition device, satellite server, central server, and viewing stations previously described with respect to FIG. 1. However, other computer systems and/or architectures may be used, as will be clear to those skilled in the art.

The computer system preferably includes one or more processors. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor.

The processor is preferably connected to a communication bus. The communication bus may include a data channel for facilitating information transfer between storage and other peripheral components of the computer system. The communication bus further may provide a set of signals used for communication with the processor, including a data bus, address bus, and control bus (not shown). The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The computer system preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory may optionally include a hard disk drive and/or a removable storage drive, for example a floppy disk drive, a magnetic tape drive, a compact disc ("CD") drive, a digital versatile disc ("DVD") drive, etc. The removable storage drive reads from and/or writes to a removable storage medium in a well-known manner. The removable storage medium may be, for example, a floppy disk, magnetic tape, CD, DVD, etc.

The removable storage medium is preferably a computer readable medium having stored thereon computer executable code (i.e., software) and/or data. The computer software or data stored on the removable storage medium is read into the computer system as electrical communication signals.

In alternative embodiments, the secondary memory may include other similar means for allowing computer programs or other data or instructions to be loaded into the computer system. Such means may include, for example, an external storage medium and an interface. Examples of external storage medium may include an external hard disk drive or an external optical drive, or and external magneto-optical drive.

Other examples of secondary memory may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units and interfaces, which allow software and data to be transferred from the removable storage unit to the computer system.

The computer system may also include a communication interface. The communication interface allows software and data to be transferred between computer system and external devices (e.g. printers), networks, or information sources. For example, computer software or executable code may be transferred to computer system from a network server via communication interface. Examples of a communication interface include a modem, a network interface card ("NIC"), a communications port, a PCMCIA slot and card, an infrared interface, and an IEEE 1394 fire-wire, just to name a few.

The communication interface preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface are generally in the form of electrical communication signals. These signals are preferably provided to the communication interface via a communication channel. The communication channel carries signals and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory and/or the secondary memory. Computer programs can also be received via the communication interface and stored in the main memory and/or the secondary memory. Such computer programs, when executed, enable the computer system to perform the various functions of the present invention as previously described.

In this description, the term "computer readable medium" is used to refer to any media used to provide computer executable code (e.g., software and computer programs) to the computer system. Examples of these media include main memory, secondary memory (including hard disk drive, removable storage medium, and external storage medium), and any peripheral device communicatively coupled with communication interface (including a network information server or other network device). These computer readable mediums are means for providing executable code, programming instructions, and software to the computer system.

In an embodiment that is implemented using software, the software may be stored on a computer readable medium and loaded into computer system by way of removable storage drive, interface, or communication interface. In such an embodiment, the software is loaded into the computer system in the form of electrical communication signals. The software, when executed by the processor, preferably causes the processor to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. An image management system, comprising:
a central data base which stores image files on a central storage device and a searchable catalog comprising a listing of available image files and a current location of each image file, the available image files comprising local image files having a current location on the central storage device and remote image files having a current location on a remote storage device associated with an image acquisition device that created the image file;
a central server associated with the central data base and communicatively coupled with the remote storage device via a network, the central server comprising:
a file transfer handling module which controls transfer of copies of data files over the network from the remote storage device to the central storage device, wherein the file transfer module is configured to add the image files created by the at least one acquisition device to a queue of images to be transferred from the remote storage location to a central storage location, to schedule a transfer time at which each image added to the queue is to be transferred, and to copy the images from the remote storage location to the central storage location at a scheduled transfer time; and
a catalog update module which adds listings of each new remote image file stored at the remote storage device to the searchable catalog along with a current location comprising the remote location, and which updates the listing associated with each remote image file to a local image file having a current location on the central storage device when the transfer of a copy of the respective image file from the remote storage device to the central storage device is complete; and
a user request and image routing module which receives user requests associated with remote image files identified in the catalog, relays a user request for a remote image file to the remote storage device, and relays requested image data from the remote storage device to the user via the central server concurrently with copying the remote image file from the remote storage location to the central storage location if the user request is received during the copying of the remote image file to the central storage location.

2. The system of claim 1, wherein the central server further comprises a user request processing module which receives requests for images stored in image files identified in the catalog, and which transfers requested image data available in a local image file at the central data storage module to the requesting user.

3. The system of claim 2, wherein the central server is further configured to send a request to the remote storage device to delete a first image file after the catalog has been updated to show that the first image file is located at the central storage device.

4. A method of managing images over a wide-area network, comprising:
acquiring an original digital image with an image acquisition device and storing the original digital image in a remote storage location associated with the acquisition device;
updating a common catalog of available digital image files to include said acquired original digital image, wherein the catalog is stored at a central storage location and each entry in the catalog comprises an image file identifier and an image location;
adding a file transfer operation to a file transfer queue maintained at the central storage location, the file transfer operation for said acquired original digital image at said remote storage location;
scheduling a transfer time at which each file transfer operation added to the queue is to be performed;
transferring a copy of said acquired original digital image from said remote storage location over a network to the central storage location at the scheduled transfer time;
storing the copy of said acquired original digital image at the central storage location;
deleting the acquired original digital image from the remote storage location;
updating the common catalog of available image files to reflect the location of said copy of said acquired original digital image at the central storage location;
receiving at the central storage location an image request from a viewing device, the image request identifying a digital image;
determining that a complete copy of the requested digital image is not located at the central storage location;
relaying the image request for image data to the remote storage location; and relaying the requested image data from the remote storage location to the viewing device via the central server, wherein relaying the requested image data from the remote location is performed concurrently with transferring the copy of the original digital image from the remote storage location to the central storage location if the image request is received during the transferring of the copy of the original digital image.

5. The method of claim 4, further comprising reducing the rate of transferring acquired digital images from a plurality of remote storage locations to the central storage location to reduce bandwidth requirements at the central storage location.

6. The method of claim 4, further comprising reducing the rate of transferring acquired digital images from a plurality of remote storage locations to the central storage location to reduce bandwidth requirements at the remote storage location.

7. The method of claim 4, wherein the trigger is a predetermined time of day.

8. The method of claim 4, wherein the trigger is a predetermined day of the week.

9. The method of claim 4, wherein deleting the acquired digital image from the remote storage location comprises sending a request message from the central storage location to the remote storage location.

10. A non-transitory computer readable medium having stored thereon one or more sequences of instructions for causing one or more processors to perform the steps for managing images over a wide-area network, the steps comprising:

acquiring an original digital image with an image acquisition device and storing the original digital image in a remote storage location associated with the acquisition device;

updating a common catalog of available digital image files to include said acquired original digital image, wherein the catalog is stored at a central storage location and each entry in the catalog comprises an image file identifier and an image location;

adding a file transfer operation to a file transfer queue maintained at the central storage location, the file transfer operation for said acquired original digital image at said remote storage location;

scheduling a transfer time at which each file transfer operation added to the queue is to be performed;

transferring a copy of said acquired original digital image from said remote storage location over a network to the central storage location at the scheduled transfer time;

storing the copy of said acquired original digital image at the central storage location;

deleting the acquired original digital image from the remote storage location;

updating the common catalog of available image files to reflect the location of said copy of said acquired original digital image at the central storage location;

receiving at the central storage location an image request from a viewing device, the image request identifying a digital image;

determining that a complete copy of the requested digital image is not located at the central storage location;

relaying the image request for image data to the remote storage location; and relaying the requested image data from the remote storage location to the viewing device via the central server, wherein relaying the requested image data from the remote location is performed concurrently with transferring the copy of the original digital image from the remote storage location to the central storage location if the image request is received during the transferring of the copy of the original digital image.

11. The medium of claim 10, further comprising reducing the rate of transferring acquired digital images from a plurality of remote storage locations to the central storage location to reduce bandwidth requirements at the central storage location.

12. The medium of claim 10, further comprising reducing the rate of transferring acquired digital images from a plurality of remote storage locations to the central storage location to reduce bandwidth requirements at the remote storage location.

13. The medium of claim 10, wherein the trigger is a predetermined time of day.

14. The medium of claim 10, wherein the trigger is a predetermined day of the week.

15. The medium of claim 10, wherein deleting the acquired digital image from the remote storage location comprises sending a request message from the central storage location to the remote storage location.

* * * * *